United States Patent [19]

Gelinas et al.

[11] Patent Number: 4,471,083

[45] Date of Patent: Sep. 11, 1984

[54] AIR DRYING COATING COMPOSITION OF AN ACRYLIC AND ALKYD POLYMER BLEND AND A POLYISOCYANATE

[75] Inventors: Brenda N. Gelinas, Sterling Heights; Lester I. Miller, Troy, both of Mich.

[73] Assignee: E. I. Du Pont de Nemours and Company, Wilmington, Del.

[21] Appl. No.: 562,814

[22] Filed: Dec. 19, 1983

[51] Int. Cl.³ .................... C09D 3/66; C09D 3/74; C08K 5/34

[52] U.S. Cl. ................... 524/100; 252/182; 524/504; 524/513

[58] Field of Search ............. 524/100, 504, 513; 252/182

[56] References Cited

U.S. PATENT DOCUMENTS 3,585,160  6/1971  Miller et al. .............. 524/504
3,844,993 10/1974  Miller et al. .............. 524/513
4,061,616 12/1977  Murayama et al. .......... 523/456

*Primary Examiner*—Ronald W. Griffin
*Attorney, Agent, or Firm*—Hilmar L. Fricke

[57] ABSTRACT

A coating composition that contains as the film-forming binder an acrylic vinyl oxazoline polymer, an alkyd resin and an additive of a polyisocyanate of the formula

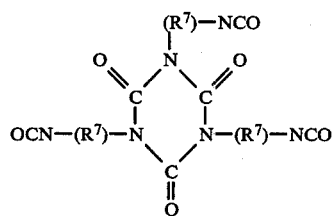

where $R^7$ is a hydrocarbon group having six carbon atoms; ultraviolet light stabilizers, an organic solvent and optionally a plasticizer; this composition cures rapidly at ambient temperatures to a tough, durable, weatherable, scratch resistant and gasoline resistant finish particularly useful for repairing finishes of automobiles or trucks.

21 Claims, No Drawings

AIR DRYING COATING COMPOSITION OF AN ACRYLIC AND ALKYD POLYMER BLEND AND A POLYISOCYANATE

BACKGROUND OF THE INVENTION

This invention relates to a coating composition and in particular to a coating composition that cures rapidly at ambient temperatures to a hard, glossy, durable, and weatherable finish. Acrylic alkyd coating compositions are widely used for painting or refinishing automobiles and trucks. One particularly high quality acrylic alkyd composition of this type is described in Miller and Walus U.S. Pat. No. 3,585,160, issued June 15, 1971. This enamel has an excellent adherence to primed, uncoated, enamel coated or lacquer coated metal substrates and dries to a glossy, smooth and durable finish. However, this composition does not cure rapidly at ambient temperature to a hard, tough, durable finish but may take up to a week of cure to reach maximum properties. Another useful acrylic alkyd coating composition containing a polyisocyanate is shown in Miller U.S. Pat. No. 3,844,993 issued Oct. 29, 1974 that does cure rapidly to form a useful finish. Current requirements are for improved durable and weatherable composition that retain the rapid cure characteristics of the above composition.

The improved composition of this invention has all of the desirable characteristics of these prior art compositions along with improved durability and weatherability.

SUMMARY OF THE INVENTION

A coating composition comprising about 5-60% by weight of a binder of a polymer blend and 95-40% by weight of a solvent for the polymer blend; wherein the blend contains (1) 40-95% by weight of an acrylic vinyl oxazoline ester polymer that has a weight average molecular weight of about 10,000-40,000 measured by gel permeation chromatography using polymethylmethacrylate as a standard and that has a backbone of polymerized ethylenically unsaturated monomers of alkyl methacrylate having 1-12 carbon atoms in the alkyl group, styrene and mixtures of these monomers and the backbone can contain up to 20% by weight, based on the weight of the polymer, of hydroxy containing monomer of a hydroxy alkyl acrylate or a hydroxy alkyl methacrylate each having 2-4 carbon atoms in the alkyl groups and contains in the backbone 3-35% by weight, based on the weight of the polymer, of polymerized vinyl oxazoline esters of the formula

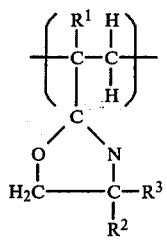

and has attached to the polymer backbone 0.5-15% by weight, based on the weight of the polymer, of pendent amino ester groups of the formula

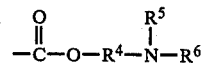

wherein
$R^1$ is the residual of drying oil fatty acids;
$R^2$ and $R^3$ are

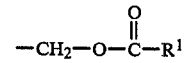

$R^4$ is an aliphatic hydrocarbon group having 1-6 carbon atoms;
$R^5$ and $R^6$ are individually selected from the group of hydrogen and a saturated aliphatic hydrocarbon group having 1-6 carbon atoms;
and correspondingly, (2) 5-60% by weight of an alkyd resin or a blend of alkyd resins;
wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid; and the composition contains about 0.5 to 200% by weight, based on the weight of the coating composition, of a polyisocyanate additive of about (A) 2 to 85% by weight, based on the weight of the additive, of a polyisocyanate of the formula

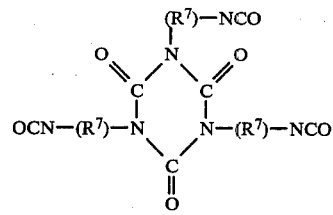

where $R^7$ is a hydrocarbon group having six carbon atoms;
(B) 1 to 10% by weight, based on the weight of the additive, of ultraviolet light stabilizer,
(C) 14 to 83% by weight, based on the weight of the additive, of organic solvent and optionally,
(D) 0.5 to 20% by weight, based on the weight of the additive, of a plasticizer.

DESCRIPTION OF THE INVENTION

The coating composition of this invention contains about 5-60% by weight of a film-forming polymer blend of about 40-95% by weight of an acrylic vinyl oxazoline ester polymer and 5-60% by weight of an alkyd resin. Preferably, the coating composition contains a polymer blend of 50-75% by weight of the acrylic vinyl oxazoline ester polymer, and correspondingly, 50-25% by weight of an alkyd resin or an acrylic resin.

The acrylic vinyl oxazoline polymer provides the coating composition with rapid air drying characteristics and excellent adhesion to substrates, such as primed or unprimed steel, alkyd enamels, alkyd melamine enamels, acrylic lacquers and the like. The polymer has a weight average molecular weight of about 10,000–40,000 measured by gel permeation chromatography using polymethyl methacrylate as the standard. This polymer and the preparation thereof is fully described in the aforementioned Miller U.S. Pat. No. 3,844,993 which is incorporated herein by reference.

One preferred acrylic vinyl oxazoline ester polymer which forms a good quality coating composition consists essentially of the following polymerized monomers: 30–40% by weight of methyl methacrylate, 40–50% by weight of butyl methacrylate, 1–10% by weight of tertiary butylamino ethyl methacrylate and 10–20% by weight of vinyl oxazoline ester of linseed oil fatty acids of the above formula and has the aforementioned weight average molecular weight.

The alkyd resin used to prepare a coating composition has an acid number of about 2–25, and preferably, about 5–14, and is about 5–7 acid number units from the gel point of the alkyd resin.

These alkyd resins are of the typical type which are the esterification product of a drying oil fatty acid, a polyhydric alcohol, a dicarboxylic and an aromatic monocarboxylic acid.

Typical drying oil fatty acids are chinawood oil, linseed oil, soya oil, tall oil and dehydrated castor oil fatty acids.

Typical polyhydric alcohols that can be used to prepare the alkyd resin are glycerine, pentaerythritol, trimethylol ethane, trimethylol propane, glycols, such as ethylene glycol, propylene glycol, butane diol, pentane diol and the like.

Typical dicarboxylic acids or anhydrides that can be used to prepare the alkyd resin are phthalic acid, phthalic anhydride, isophthalic acid, therephthalic acid, maleic acid or its anhydride, fumaric acid and the like. Typical monocarboxylic aromatic acids are benzoic acids, paratertiary butylbenzoic acid, phenol acetic acid, triethyl benzoic acid and the like.

One preferred alkyd resin is the esterification product of linseed oil fatty acids/benzoic acid/phthalic anhydride/pentaerythritol.

The following are typically useful solvents that can be used in formulating the coating composition or can be subsequently used to reduce the coating composition to an application viscosity: acetone, 2-nitro propane, methyl ethyl ketone, amyl alcohol, ethylene glycol monoethyl ether acetate, propylene glycol monomethyl ether acetate, ethyl acetate, ethyl alcohol, isopropanol, ethylene dichloride, diacetone alcohol, diisobutyl ketone, cyclohexanone, amyl acetate, ethylene glycol monobutyl ether, furfural, petroleum naphtha, toluene, xylene, substituted benzene, substituted toluene, hexane, aromatic hydrocarbons, high boiling petroleum naphthas, high solvency petroleum hydrocarbons, diethyl ether, methyl amyl acetate, butanol and the like.

Preferably, the coating composition is pigmented and contains pigment in a pigment to binder ratio of about 1:100 to about 75:100. The term "binder" referes to the film-forming constituents in the coating composition. Examples of the great variety of pigments which are used in the coating composition are metallic oxides, preferably titanium dioxide, zinc, oxide, iron oxide and the like, metal hydroxides, metal flakes, such as lead chromate, sulfides, sulfates, carbonates, carbon black, silica, talc, china clay, lead blues, iron blues, organic reds, organic maroons, and other organic dyes and lakes.

The pigments can be introduced into the coating composition by first forming a mill base with the alkyd resin or the acrylic vinyl oxazoline polymer by conventional sand grinding or ball mill techniques, and then blending the mill base with the film-forming polymers as shown in the following Examples.

Plasticizers in amounts up to 10% by weight, based on the weight of binder, can be used in the coating composition. Typical plasticizers that can be used are benzylbutyl phthalate, dibutyl phthalate, triphenyl phosphate, 2-ethyhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl-hexyl ester of hexamethylene diphthalate, di(methylcyclohexyl)phthalate, di(methylcyclohexyl)phthalate. One preferred plasticizer of this group is triphenyl phosphate since it forms a coating with excellent balance of properties.

Small amounts of conventional metallic driers are used in the coating composition, such as lead naphthenate, manganese naphthenate, cobalt naphthenate, lead tallate, nickel salts, such as nickel octoate and the like.

The polyisocyanate additive preferably is added to the above described coating composition and blended therewith shortly before the resulting composition is used. About 0.5 to 200% by weight, based on the weight of the coating composition, is used and preferably, about 20 to 100% by weight of the polyisocyanate additive is used.

The polyisocyanate additive comprises about 2 to 85% by weight, based on the weight of the additive, of a polyisocyanate having the formula

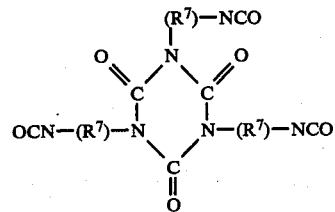

where $R^7$ is a hydrocarbon group having 6 carbon atoms. The above polyisocyanate is 1,3,5-tris(6-isocyanatohexyl)1,3,5-triazine 2,4,6(1H,3H,5H)trione. Commercially available polyisocyanate compositions contain the above polyisocyanate and small amounts of higher molecular weight moieties such as dimers, trimers and hexamers of the above polyisocyanate.

The polyisocyanate additive contains about 1 to 10% by weight, based on the weight of the additive, of ultraviolet light stabilizer. Typical ultraviolet light stabilizers that are useful are as follows:

Benzophenones such as hydroxydodecycl benzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-β-(3,5-di-t-butyl-4-hydroxyphenyl)propionate, α,α'-bis(2-hydroxyphenyl)-diisopropylbenzene, 3,5'-dibromo-2'-hydroxyacetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl) resorcinol, bis(3-hydroxy-4-benzoylphenoxy)diphenylsilane, bis(3-hydroxy-4-benzoylphenoxy)dialkylsilane, 1,8-naphthalimides, α-cyano-β,β-diphenylacrylic acid derivatives, bis(2-benzoxazolyl)alkanes, bis(2-napthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropylphenyl-6-hydroxycoumarone.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

Blends of ultraviolet light stabilizers are particularly useful such as a blend of a hindered amine light stabilizer and a benzotriazole ultraviolet light stabilizer. The following blend of ultraviolet light stabilizers is particularly preferred 2-[2'-hydroxy-3',5'-1(1-1-dimethylpropyl)phenyl]benzotriazole and di-[4-(2,2,6,6,-tetramethylpiperidyl)]sebecate. The stabilizers can be used in any ratio however, a 2:1 ratio of benzotriazole to sebecate is preferred. Another particularly preferred blend of ultraviolet light stabilizers is the above benzotriazole and bis(1,2,2,6,6-pentamethyl-4-piperidinyl)sebecate in a 1:1 ratio.

The polyisocyanate additive contains about 14 to 83% by weight of organic solvent. Any of the aforementioned solvents can be used. Preferred solvents are ethyl acetate, toluene, xylene, ethylene glycol monoethyl ether acetate, diethylene glycol monobutyl ether, propylene glycol monomethyl ether acetate and mixtures thereof.

A preferred polyisocyanate additive contains about 25-45% by weight, based on the weight of the additive of polyisocyanate, 1-5% by weight of ultraviolet light stabilizer and 50-74% by weight organic solvent.

The polyisocyanate additive also may contain 0.5-20% by weight of a plasticizer. Any of the aforementioned plasticizers can be used. Triphenyl phosphate is one preferred plasticizer.

Another preferred polyisocyanate additive contains about 60 to 84% by weight of the polyisocyanate described above, 1 to 5% by weight of a blend of ultraviolet light stabilizers of a hindered amine and a benzotriazole, 5 to 15% by weight of a plasticizer and 10 to 25% by weight of an organic solvent.

After the additive is blended with a coating composition, the resulting blend is applied by conventional technique such as spraying, electrostatic spraying, brushing, dipping and the like to a substrate and dried at ambient temperatures. Low baking temperatures of 50°–125° C. can also be used to force dry the composition. The resulting finishes have good flexibility and retain the other good properties of the composition to which they were added.

The following examples illustrate the invention. All parts and percentages are on a weight basis unless otherwise indicated.

EXAMPLE 1

An acrylic vinyloxazoline ester polymer solution was prepared following the procedure of Example 1, Miller U.S. Pat. No. 3,844,993. The resulting polymer solution had a polymer solids content of 58% by weight and the polymer is the polymerization product of 35% by weight methyl methacrylate, 44% by weight butyl acrylate, 6% by weight tertiary butylaminoethylmethacrylate and 15% by weight vinyloxazoline ester of linseed oil fatty acids and the polymer has a calculated weight average molecular weight of about 36,000.

An alkyd resin solution was prepared by following the procedure in Example 1 of the aforementioned Miller patent. The alkyd resin solution had a resin solids content of 55% by weight and the alkyd resin is the esterification product of 41.6% by weight linseed oil fatty acid/pentaerythritol, 15% pentaerythritol benzoate, 39.4% pentaerythritol phthalate and 4% pentaerythritol and has a weight average molecular weight of about 12,000 determined by gel permeation chromatography.

A pigment dispersion was prepared as follows:

|  | Parts by Weight |
|---|---|
| Titanium dioxide pigment (sulfate process) | 630.0 |
| Soya glycerol phthalate alkyd resin solution (55% resin solids in which the alkyd is of 43% soya oil, 52% glycerol phthalate, 5% glycerin) | 158.0 |
| Xylene | 212.0 |
| Total | 1000.0 |

The ingredients were premixed and charged into a conventional sand-grinding mill and ground to about a 0.3 mil fineness.

A paint composition was formed by mixing the following ingredients:

| | Parts by Weight |
|---|---|
| Portion 1 | |
| Pigment Dispersion (prepared above) | 188.02 |
| Soya glycerol phthalate alkyd resin solution (55% resin solids, alkyd described in pigment dispersion) | 26.10 |
| Alkyd resin solution (prepared above) | 136.90 |
| Acrylic-vinyl oxazoline polymer solution (prepared above) | 302.59 |
| Cobalt naphthenate drier solution (6% cobalt in a hydrocarbon solvent) | 2.68 |
| Manganese naphthenate drier solution (66% manganese in a hydrocarbon solvent) | 0.28 |
| Lead tallate drier solution (24% lead in a hydrocarbon solvent) | 2.68 |
| Hydrocarbon solvent (boiling point 189–219° C., aniline point 28° C.) | 34.43 |
| Naphtha solvent (boiling point 100–163° C.) | 79.56 |
| Portion 2 | |
| Hydrocarbon solvent (boiling point 150–190° C., aniline point −28° C.) | 79.12 |
| Total | 852.36 |

Portion 1 was mixed for about 1 hour and then Portion 2 was added and mixed.

The following additives A and B were prepared.

| Additive A | Parts by Weight |
|---|---|
| Portion I | |
| Ethylene glycol monoethyl ether acetate | 15.67 |
| Ethyl acetate | 454.37 |
| 2-[2'-hydroxy-3',5'-1 (1-1-dimethyl propyl)-phenyl]benzotriazole | 10.61 |
| di-[4-(2,2,6,6-tetramethyl piperidyl)]sebecate | 10.61 |
| Portion II | |
| Polyisocyanate (having the aforementioned structural formula and is 1,3,5-tris(6-isocyanatohexyl)1,3,5-triazine 2,4,6(1H, 3H, 5H)trione containing small amounts of higher molecular weight moieties) | 284.62 |
| Total | 820.00 |

Portion 1 was charged into a mixing vessel and mixed and then portion II was added and thoroughly mixed.

| Additive B | Parts by Weight |
|---|---|
| Portion I | |
| Ethyl acetate | 90.0 |
| Diethylene glycol monobutyl ether | 54.0 |
| Toluene | 27.0 |
| Triphenyl phosphate | 72.0 |
| Portion II | |
| 2-[2'-hydroxy-3',5'-1 (1-1dimethyl-propyl)phenyl] benzotriazole | 27.0 |
| Portion III | |
| Polyisocyanate(described above) | 630.0 |
| Total | 900.0 |

Portion I was charged into a mixing vessel and mixed, Portion II was added with mixing and then portion III was added and the constituents were thoroughly mixed.

About 1 part by volume of additive A was blended with 8 parts by volume of the above paint composition and the resulting composition was sprayed onto primed steel panels and dried at ambient temperatures. The resulting finish was glossy, durable, weatherable and gasoline resistant and showed good gloss retention after exposure to weathering in Florida.

A second composition was prepared by blending about 1 part by volume of additive B with 8 parts by volume of the above paint composition and the resulting composition was sprayed onto primed steel panels and dried at ambient temperatures. The resulting finish also was glossy, durable, gasoline resistant and weatherable and showed good gloss retention after exposure to weathering in Florida.

We claim:

1. A coating composition comprising 5–60% by weight of a binder of a polymer blend and 95–40% by weight of a solvent for the polymer blend; wherein the blend comprises (1) 40–95% by weight of an acrylic vinyl oxazoline ester polymer having a weight average molecular weight of about 10,000–40,000 measured by gel permeation chromatography and which consists essentially of a backbone of polymerized ethylenically unsaturated monomers selected from the group consisting of an alkyl methacrylate having 1–12 carbon atoms in the alkyl group, styrene and mixtures of these monomers and up to 20% by weight, based on the weight of the polymer, of a hydroxy containing monomer selected from the group consisting of hydroxy alkyl acrylate and hydroxy alkyl methacrylate each having 2–4 in the alkyl groups and containing in the backbone 3–35% by weight, based on the weight of the polymer, of polymerized vinyl oxazoline esters of the formula

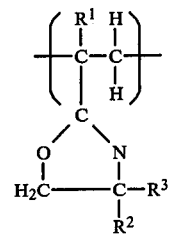

and having attached to the polymer backbone 0.5–15% by weight, based on the weight of the polymer, of pendent amino ester groups of the formula

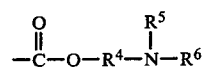

wherein
R¹ is the residual of drying oil fatty acids
R² and R³ are

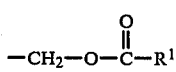

R⁴ is an aliphatic hydrocarbon group having 1-6 carbon atoms;
R⁵ and R⁶ are individually selected from the group consisting of hydrogen or a saturated aliphatic hydrocarbon group having 1-6 carbon atoms; and
(2) 5-60% by weight of an alkyd resin or a blend of alkyd resins; wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid; and
the composition contains about 0.5 to 200% by weight, based on the weight of the composition, of a polyisocyanate additive comprising
(A) 2-85% by weight, based on the weight of the additive, of a polyisocyanate of the formula

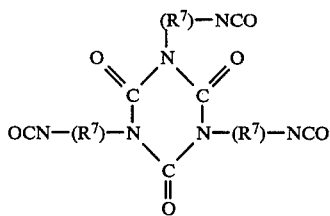

where R⁷ is a hydrocarbon group having 6 carbon atoms;
(B) 1-10% by weight, based on the weight of the additive, of ultraviolet light stabilizer, and
(c) 14-83% by weight, based on the weight of the additive, of organic solvent.

2. The coating composition of claim 1 containing pigment in a pigment to binder ratio of about 1:100 to about 75:100.

3. The coating composition of claim 2 in which the backbone of the acrylic vinyl oxazoline polymer is of butyl methacrylate and methyl methacrylate, R¹ is from linseed oil fatty acids, R⁴ is an ethylene group, R⁵ is hydrogen, R⁶ is a tertiary butyl radical, the alkyd resin is the esterification product of linseed oil fatty acids, benzoic acid, pentaerythritol and phthalic anhydride.

4. The coating composition of claim 3 in which the additive consists essentially of about
(A) 60-84% by weight, based on the weight of the additive, of polyisocyanate,
(B) 1-5% by weight, based on the weight of the additive, of 2-[2'hydroxy-3',5'-1(l-1-1-dimethyl-propyl-phenyl]benzotriazole,
(C) 5-15% by weight of triphenyl phosphate and
(D) 10-25% by weight of organic solvent blend of ethyl acetate, toluene and diethylene glycol monobutyl ether.

5. The coating composition of claim 3 in which the additive consists essentially of about
(A) 25-45% by weight, based on the weight of the additive, of polyisocyanate, (B) 1-5% by weight, based on the weight of the additive of ultraviolet light stabilizers of 2-[2'-hydroxy-2',5',-1(l-1-dimethylpropyl)-phenyl]benzotriazole and di-[4-(2,2,6,6-tetramethylpiperdyl)]sebecate,
(C) 50-74% by weight of organic solvent blend of ethylene glycol monoethyl ether acetate, ethyl acetate and xylene.

6. The coating composition of claim 2 in which the ultraviolet light stabilizers comprise a blend of a benzotriazole ultraviolet light stabilizer and a hindered amine light stabilizer.

7. The coating composition of claim 3 which the blend of ultraviolet light stabilizers consists essentially of 2-[2'hydroxy-3',5'-1(l-1-dimethyl-propyl)phenyl]benzotriazole and di-[4-(2,2,6,6-tetramethyl-piperidyl)-]sebecate.

8. The coating composition of claim 3 in which the ultraviolet light stabilizers consists essentially of 2-[2'hydroxy-3',5'-1(l-1-dimethylpropyl)phenyl]benzotriazole and bis(1,2,2,6,6-pentamethyl-4-piperdinyl)-sebecate.

9. The coating composition of claim 1 in which organic solvent of the additive are selected from the group consisting of ethyl acetate, toluene, xylene, ethylene glycol monoethyl ether acetate, diethylene glycol monobutyl ether, propylene glycol monomethyl ether acetate and mixtures thereof.

10. The coating composition of claim 6 containing in addition about 0.5-20% by weight, based on the weight of the additive, of plasticizer.

11. The coating composition of claim 10 in which the plasticizer is triphenyl phosphate.

12. A substrate coated with a dried coalesced layer of the composition of claim 1.

13. An additive for coating compositions comprising a polyisocyanate additive comprising
(A) 2-85% by weight, based on the weight of the additive, of a polyisocyanate of the formula

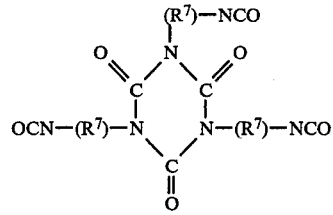

where R⁷ is a hydrocarbon group having 6 carbon atoms;
(B) 1-10% by weight, based on the weight of the additive of ultraviolet light stabilizer, and
(C) 14-83% by weight, based on the weight of the additive of organic solvent.

14. The additive of claim 13 in which the ultraviolet light stabilizers comprise a blend of a benzotriazole ultraviolet light stabilizer and a hindered amine light stabilizer.

15. The additive of claim 14 which the blend of ultraviolet light stabilizers consists essentially of 2-[2'hydroxy-3',5'-1(l-1-dimethylpropyl)phenyl]benzotriazole and di-[4-(2,2,6,6-tetramethyl-piperidyl)]sebecate.

16. The additive of claim 13 in which the ultraviolet light stabilizers consists essentially of 2-[2'hydroxy-3',5'-1(l-1-dimethyl-propyl)phenyl]benzotriazole and bis(1,2,2,6,6-pentamethyl-4-piperidinyl)sebecate.

17. The additive of claim 13 in which organic solvents of the additive are selected from the group consisting of ethyl acetate, toluene, xylene, ethylene glycol monoethyl ether acetate, diethylene glycol monobutyl ether, propylene glycol monomethyl ether acetate and mixtures thereof.

18. The additive of claim 13 containing in addition about 0.5-20% by weight, based on the weight of the additive of plasticizer.

19. The additive of claim 18 in which the plasticizer is triphenyl phosphate.

20. The additive of claim 13 consisting essentially of about
(A) 60-84% by weight based on the weight of the additive, of the polyisocyanate,
(B) 1-5% by weight, based on the weight of the additive, of 2-[2'-hydroxy-3',5'-1(l-1-dimethyl-propyl-phenyl]benzotriazole,
(C) 5-15% by weight of triphenyl phosphate and
(D) 10-25% by weight of organic solvent blend of ethyl acetate, toluene and diethylene glycol monobutyl ether.

21. The additive of claim 13 consisting essentially of about
(A) 25-45% by weight, based on the weight of the additive, of the polyisocyanate,
(B) 1-5% by weight, based on the weight of the additive of ultraviolet light stabilizers of 2-[2'-hydroxy-3',5'-1(l-1-dimethyl-propyl)phenyl]benzotriazole and di-[4-(2,2,6,6-tetramethylpiperidyl)]sebecate,
(C) 50-74% by weight of organic solvent blend of ethylene glycol monoethyl ether acetate, ethyl acetate xylene.

* * * * *